May 23, 1961 C. J. MERCHANT 2,985,777
VIBRATORY MOTOR DRIVE
Filed Oct. 31, 1956 3 Sheets-Sheet 1

INVENTOR.
CHARLES J. MERCHANT
BY
Eber J. Hyde
ATTORNEY

May 23, 1961 C. J. MERCHANT 2,985,777
VIBRATORY MOTOR DRIVE
Filed Oct. 31, 1956 3 Sheets-Sheet 2

INVENTOR.
CHARLES J. MERCHANT
BY
Eber J. Hyde
ATTORNEY

May 23, 1961  C. J. MERCHANT  2,985,777
VIBRATORY MOTOR DRIVE

Filed Oct. 31, 1956  3 Sheets-Sheet 3

INVENTOR.
CHARLES J. MERCHANT
BY
Elmer J. Hyde
ATTORNEY

United States Patent Office 2,985,777
Patented May 23, 1961

2,985,777

VIBRATORY MOTOR DRIVE

Charles J. Merchant, Cleveland Heights, Ohio, assignor to Homer W. Giles, University Heights, and C. R. Young, Shaker Heights, Ohio Filed Oct. 31, 1956, Ser. No. 619,497

20 Claims. (Cl. 310—21)

This is a continuation-in-part of my prior application Serial No. 587,544, filed May 28, 1958, now abandoned.

This invention pertains to a vibratory drive motor and system, and to a simple, inexpensive alternating current operated electric impeller whose vibratory system is tuned whereby the electric power put into the impeller is effectively and efficiently obtained in the form of a motion which may be applied to a device to be moved, as for example, a sheet of material, or a wheel or an axle to be turned.

Briefly, the present invention deals with a vibratory armature type impeller of the magnetically polarized or non-polarized, A.C. energized type, and it differs from prior art systems by having its vibratory portions tuned to certain frequencies, correlated with the driving frequency in the non-polarized type whereby under a variety of operating conditions, maximum energy transfer from the impeller to the device to be moved is obtained.

In the past many vibratory motors has been described in which the reciprocating motion of the free end of a vibratory armature is transformed into rectilinear or circular motion by means of ratchets, either actual ratchets as employed in stepping relays, or virtual ratchets in which a ratchet effect is achieved by utilizing the unidirectional frictional properties of specially shaped vibrating members which exert a greater gripping effect when moving in one direction. See U.S. Patents 371,331 Kornmuller; 1,718,147 Hermann et al.; 1,816,102 Waters et al.; 1,966,315 Siliceo; 2,451,840 Lewandowski; 2,656,474 Rohden. All such motors suffer from serious defects. A common fault is noisiness of operation, the actual ratchet motors being the worst offenders in this respect. Perhaps the worst and most common defect is the lack of efficiency and power output. In both the actual and virtual ratchet motors the total power output is the difference between the power delivered during the forward stroke of the armature, less the power consumed in friction on the backward stroke. In the case of those motors which operate as virtual ratchets, both slippage in the forward direction and friction on the backstroke substantially diminish the fraction of the energy of the armature which is actually delivered to the load.

It is, therefore, an object of the present invention to provide an alternating current vibratory impeller system which is much more effective and efficient than motors heretofore made.

A further object of the present invention is to provide a vibratory drive system energized by alternating current and having moving parts whose mass and compliance are so correlated with each other, and in one instance are also correlated with the driving frequency of the A.C., that the phenomenon of resonance is utilized, leading to maximum usage of the electric power applied to the impeller.

A further object of the invention is to provide a resonant vibratory drive system for driving a sheet member or a wheel or the like, wherein the vibrating parts of the system are compounded and are compliant, the masses and the compliances of the several vibrating systems being correlated with the frequency of the driving alternating current to establish a flail-like action of the free end of the driving system, this flail-like action being powerful and efficiently transferring the power to the device to be driven.

Another object of the invention is to provide an inexpensive vibratory drive system or impeller which is quiet in its operation, which is inexpensive to make, and which may be utilized to drive a flat or curved member to be driven, the adjustment between the impeller and the member to be driven establishing either a powerful drive or a fast drive whereby the device effectively has "built in" gears, but in both instances the energy transfer being very efficient.

Still another object of the invention is to provide a resonant vibratory armature type impeller wherein the mass, compliance, and mounting of the several vibratory parts are proportioned to form a doubly resonant system designed to give the impeller outstandingly efficient motion which can be expressed as more power at lower speed, thereby without gears giving the designer the desired output charcteristic.

Another object of the invention is to provide a resonant vibratory impeller system whose effective masses and compliances when the device is in driving engagement with a member to be driven are so tuned that its engaging portion describes a lenticular curve with at least one side, called the forward side, convex; the engaging portion contacting the member to be driven throughout a portion of the forward side of the curved path and being free from contact on the back swing or reverse side of the curved path.

For a better understanding of the present invention, together with other and further objects thereof, reference is had to the following description taken in conjunction with the accompanying drawings, and its scope will be pointed out in the appended claims.

Figures 5–8 inclusive, show various positions of the several parts of the vibratory device as it moves through its cycle as though seen in slow motion.

Figure 9:
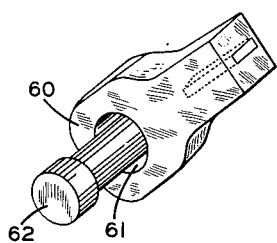

Figure 9 is a side view of a special clutch foot for use with the device of the invention.

Figure 10:
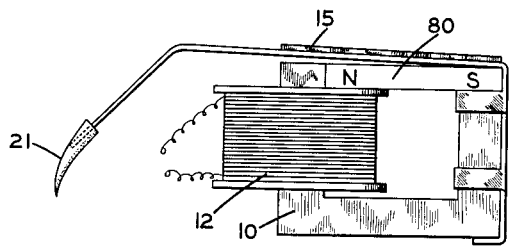

Figure 10 is a side view of a polarized system embodying the invention.

Figure 11:
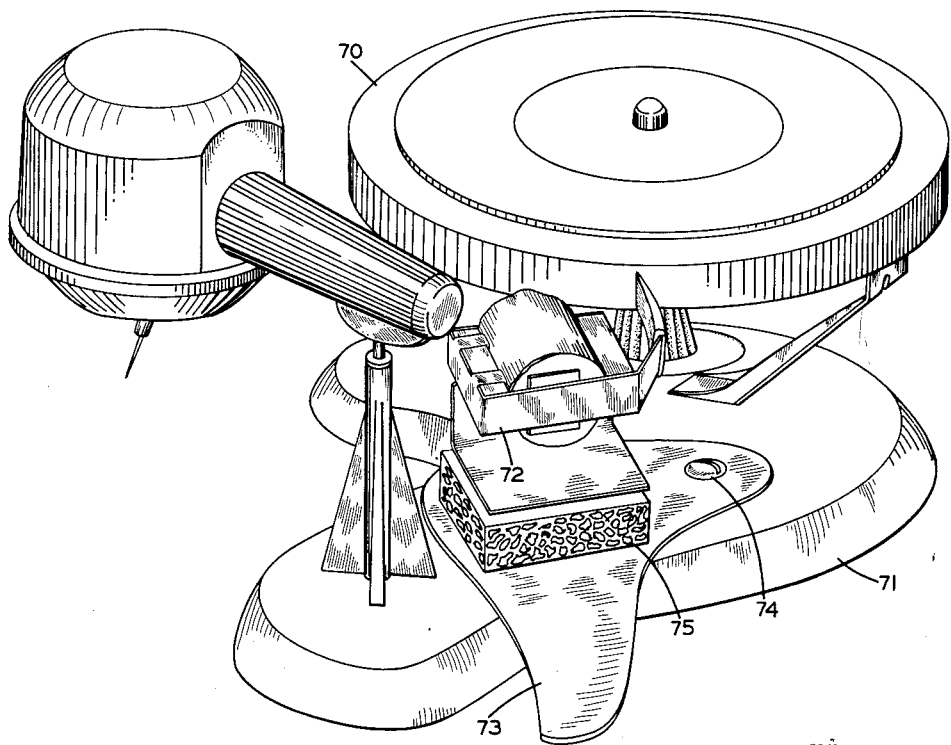

Figure 11 is an isometric view of a toy phonograph embodying the impeller of the invention.

An aspect of the present invention lies in the provision of an electromechanical resonant vibratory drive system, which is either magnetically polarized or which is unpolarized, comprised of an electromagnet having a coil to be connected to a source of alternating electric current and a fixed core associated with the coil forming part of a magnetic circuit. Compliant armature means are provided, one portion of which is free to vibrate forming part of the magnetic circuit and defining with the core an air gap. Compliant clutch foot means are connected to the free portion of the armature and extend away therefrom at an angle. The compliant clutch foot means includes a portion for engaging the member to be driven. The armature means vibrates at a frequency $f$ under the influence of the varying magnetic field of the coil. The heart of the invention lies in correlating the effective distributed mass of the armature means and of the compliant clutch foot means with the effective distributed compliance of the armature means when the clutch foot means is in contact with the member to be driven to form a resonant system tuned to a frequency below $2f$, and correlating the effective distributed mass of the compliant clutch foot means and its effective distributed compliance to form a second resonant system which when the clutch foot means is in contact with the member to be driven has a resonant frequency greater than $f$. This causes the free end of the compliant clutch foot means, while driving the member to be driven, to describe a lenticular curve with at least one side convex. This aspect of the invention pertains to an alternating current resonant vibrating drive system which is magnetically polarized such as by a permanent magnet or by a direct current field, as well as to a non-polarized alternating current operated device.

Another aspect of the invention pertains especially to the non-polarized, alternating current operated electromechanically resonant vibrating drive system wherein the frequency of the alternating current is F and the vibrator has a core within coil forming part of a magnetic circuit. Armature means are mounted to form part of the magnetic circuit and define with the core an air gap. Spring means are provided for biasing the armature means. One end of a compliant arm means is connected to the free end of the armature means, and a compliant clutch foot is connected to the other or free, end of the arm means. The overall distributed mass of the armature means, the arm means, and the foot, and the compliance of the spring means biasing the armature means forms a resonant vibratory system tuned to a frequency below 2F, and the overall distributed mass of said arm means and the foot and the compliance of the arm means form a second resonant vibratory system tuned to a frequency above 2F. With this relationship the clutch foot describes a lenticular curve with at least one side convex.

Another aspect of the invention lies in the positioning of either of the above described two drive systems with respect to a body to be driven so that the clutch foot engages the body to be driven primarily in the first quadrant of the convex side of the lenticular curve.

Another main aspect of the present invention lies in the provision of the second of the two aforedescribed electromechanic resonant vibratory drive systems, but in which the second resonant vibratory system is tuned to a frequency above 2F only when the clutch foot is in engagement with, and is loaded by, the device to be driven.

Still another aspect of the invention lies in the two above described vibratory systems properly mounted with respect to the body to be driven and having a longitudinally compliant foot tuned to expand and contract in synchronism with the period of the tracing of the lenticular curve whereby energy stored in the foot by compression during impact with the body to be driven, is efficiently imparted to that body by an expansion of the foot as the foot moves away from the body during each cycle of operation.

Figure 1:
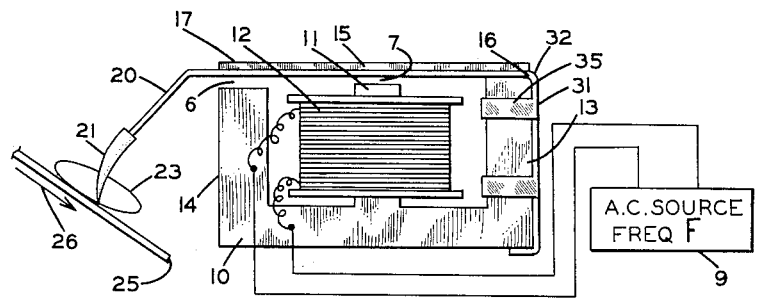
Figure 1 shows a typical device embodying the invention.

With reference to Figure 1 there is shown an electromechanical vibrator of the non-polarized type comprising an E-shaped core of magnetizable material 10 having a central leg or core 11 about which an electrical coil 12 is wound and two spaced apart end legs 13, 14. An armature formed of a lamination of spring material 15 and one or more laminations 17 of magnetic material lies in the magnetic field of the gap between the ends of legs 13, 14 thereby closing through the center leg 11 the magnetic circuit which is set up when the coil 12 is electrically energized. The armature is spring mounted to the core by securing end 16 of the spring material 15 to the core or to other suitable connecting means, such as by the back strap 31 and one or more core encircling arms 35. The end 16 of the armature may merely be soldered to the core leg 13, the other end of the armature being free to vibrate with respect to the core as the coil 12 is energized with alternating current at a frequency F, or, as shown, the end of 16 of the armature may be integral with the back strap 31. In the device shown in Figure 1 the armature 17 should have sufficient cross-sectional area to adequately handle the flux set up in the core 10 when the coil is energized, and a portion of the armature preferably extends slightly beyond the core leg 14 at the vibratory or free end of the armature. Secured to the free or vibratory end of the armature and extending away therefrom at an angle to the armature is a clutch foot 20, 21, which may be comprised solely of a compliant rubber-like member or which, as shown, may comprise an angularly extending metal arm 20 terminating in a compliant foot 21. For convenience the backstrap 31, the armature portion 15 and the arm 20 may be integral.

In order to obtain outstanding results when the vibratory device shown in Figure 1 is applied to driving a movable body certain relationships of mass, compliance and frequency must be complied with. Two tuned resonant systems are established in the movable portions of the device, the first resonant system is comprised of the mass of armature 15, 17, plus the mass of the clutch foot (arm 20 and foot 21) and the compliance of the armature portion 15 and its spring hinge at point 16. The overall distributed mass of the armature means and of the clutch foot and the compliance of the spring means mounting the armature form a first resonant vibratory system tuned to a frequency below 2F. The second resonant system is comprised of the mass of the clutch foot (arm means 20 and foot 21) and the compliance of the clutch foot. This second resonant system is tuned to a frequency above 2F.

Figure 3:
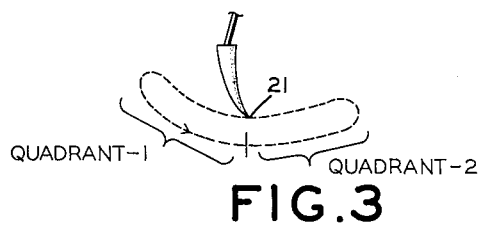
Figure 3 shows another desirable type of motion of the driving foot.

When these two critical relationships simultaneously exist in a vibratory device such as that shown in Figure 1, the tip of the clutch foot describes a lenticular curve having at least one convex side. When the tip of the foot describes a lenticular curve having two convex sides, an ellipse is generated, as shown in Figure 1, and this is also very desirable. The lenticular curve having only one convex side is shown in Figure 3.

With the armature system tuned to a frequency below 2F and with the clutch foot system tuned to a frequency above 2F excitation of coil 12 at a frequency F will cause the foot 21 to trace a lenticular Lissajous curve or, on occasion, an ellipse 23 if the foot is not in contact with a device 25 to be driven. When the foot 21 is in contact with a sheet of material or a wheel to be driven it tries to move along the lenticular curve but is restrained somewhat by the device in contact with it. However, because it tries to trace the lenticular curve it changes the apparent coefficient of friction between the foot and the device to be impelled. That is, as the foot 21 moves down toward the device 25 its engagement is a forceful one, but as it moves up and away from the device 25 its engagement is broken. Accordingly, the sheet of material 25 shown in Figure 1 will shoot out in the direction shown by arrow 26. The sheet 25 will be forcefully propelled in direction 26. An amazing amount of force is exerted on the sheet 25 by the foot 21. The reason for this is the flail-like action of the armature 15 and the arm 20. The flail-like action is obtained due to the angular relationship between the armature 15 and the arm 20 and due to the proper resonance in the armature and arm with respect to the driving frequency of the coil 12.

Figure 2:
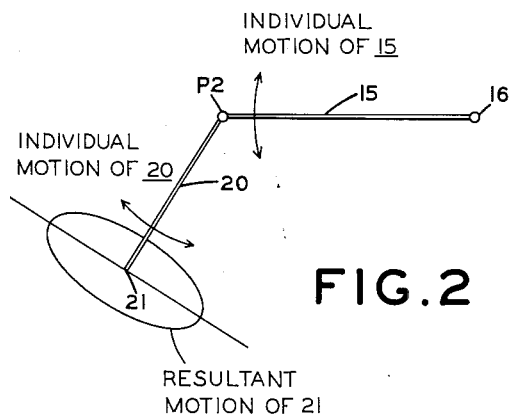
Figure 2 is a diagram illustrating the basic principle of the invention showing one type of motion of the driving foot.

The method by which this is accomplished can be understood by reference to Figure 2.

Figure 2 diagrammatically illustrates the generation of the elliptical motion of the foot 21. In this figure, 15 is an arm pivoted at the end of 16, and carrying on its other end at P2, a second arm 20 which is pivoted at P2. If now arm 15 oscillates up and down at frequency F as shown, and simultaneously arm 20 oscillates at the same frequency F as shown, then free end 21 will move in an elliptical path, as shown. In addition to a pure elliptical path, a lenticular path such as that shown in Figure 3 is highly satisfactory.

The device of this invention utilizes the phenomenon of resonance and this creates a device in which a compound armature, equipped at its free end with a compliant foot or clutch means causes this foot to trace such an elliptical path. This rotating laterally compliant foot is then brought intermittently in contact with a body to be moved in such a way that only a certain desired part of the path of the foot intersects the body to be moved.

Additionally, the laterally compliant clutch foot is longitudinally compliant, thus enabling it to longitudinally absorb the shock of the blow at the instant it engages the body to be driven, thereby substantially reducing the noise of operation and also achieving much more efficient operation since the energy of impact is not dissipated but is stored as a longitudinal compression of the compliant foot and imparted gradually to the body to be moved in synchronism with rotating motion of the foot.

The compliant clutch member 21 is made of rubber or a similar material preferably shaped like a curving wedge. Such a member is itself a resonating system possessing, as a matter of fact, an infinite number of resonant frequencies when excited in the transverse mode, i.e. when the tip is moved from side to side in the plane of the drawing. We are, however, concerned only with the fundamental frequency in this mode which frequency should, for best results, be greater than 2F, but preferably only slightly greater. When such a member is affixed at an angle to the armature, the whole constitutes a compound armature, which, when current of frequency F, is supplied to the electromagnet, will move as a whole so that the tip of the compliant clutch will describe an ellipse in the direction shown. If the transverse resonant frequency of the compliant clutch is made less than 2F, the direction of rotation of this ellipse will be reversed and little or no useful power can be secured from the motor. Other conditions will produce an elliptical motion of the foot, but when the foot engages a member to be driven the ellipse is destroyed and substantially no power is imparted to the member to be driven.

The significance of the longitudinal curve in the compliant clutch lies in the fact that by such a design we impart to the compliant clutch longitudinal compliance of a straight wedge, rendering it more able to absorb the shock of the blow delivered to the driven member, thereby reducing the noise of operation and simultaneously storing the energy of this blow for smooth release during the period of contact. By properly choosing the amount of curvature in the compliant clutch for a given load, performance can be enhanced to a degree not otherwise possible.

To illustrate more fully the action of this device reference is made to Figures 5, 6, 7, and 8. These show the sequence of motions as they would be observed by means of a stroboscope, slow motion photography, or other means for greatly slowing down the sequence to permit its observation by the eye. In these figures the object to be moved is a wheel which is made of some material having a high coefficient of friction against rubber.

Figure 5:
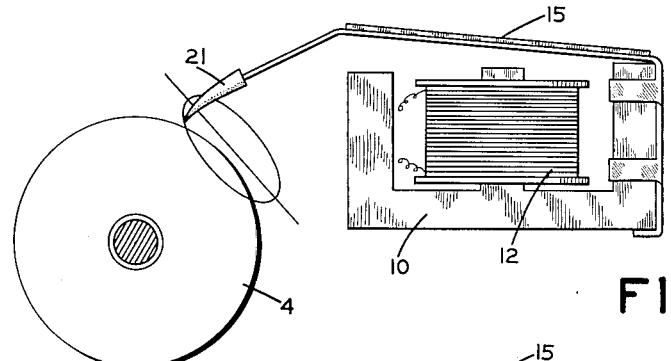

In Figure 5 the armature is at the top of its stroke and about to begin its downward swing. Simultaneously, the compliant clutch begins its forward swing. The clutch foot is out of contact with the wheel to be driven.

Figure 6:
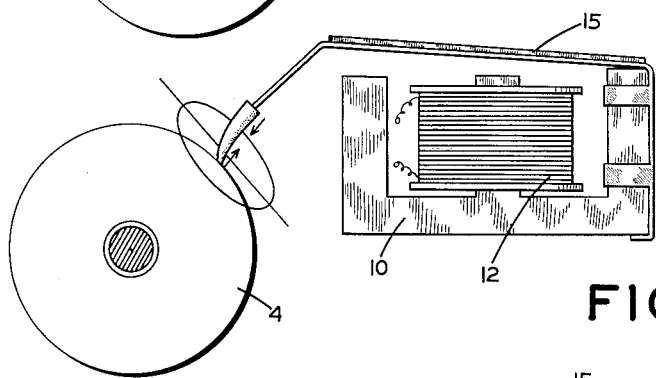

In Figure 6 the armature is well into its downward swing. The compliant foot is swinging forward and has engaged the surface of the wheel so that the foot is longitudinally compressed.

Figure 7:
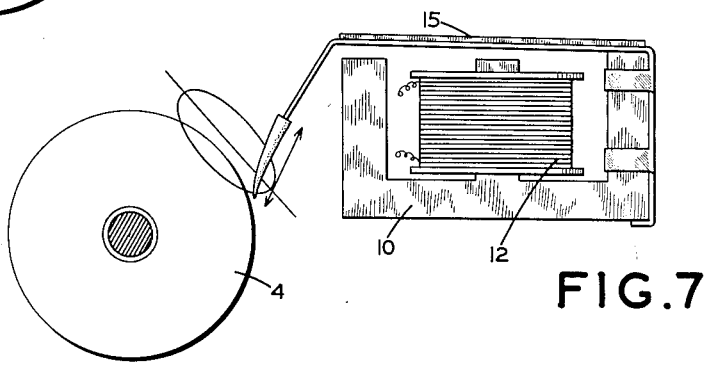

In Figure 7 the armature has completed its downward swing and has begun its up-swing. The compliant clutch has just completed its forward swing and due to its inertia and due to its springing back from its compressed condition it maintains contact with the wheel longer than it would if it were not longitudinally compliant, thereby giving an added push to the wheel.

Figure 8:
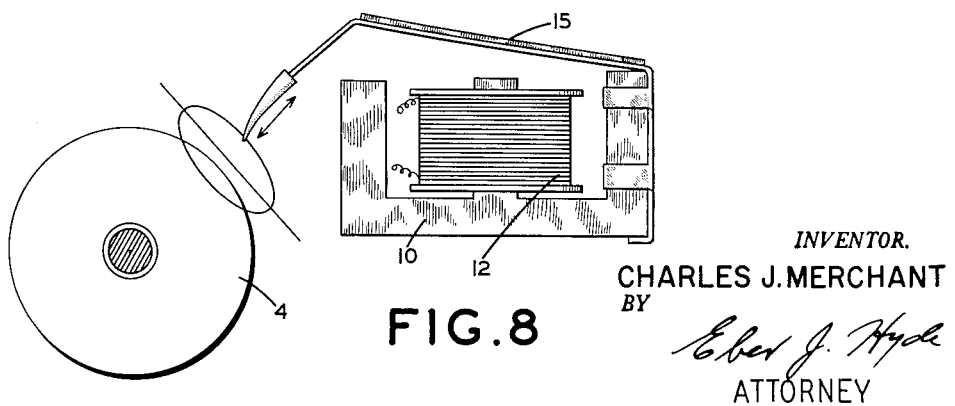

In Figure 8 the armature is on its upward swing. The compliant clutch is totally disengaged from the wheel and is going through its return swing.

Figure 3 illustrates a preferred lenticular, or elliptical path for the free end of the clutch foot to follow. This is a concave-convex lenticular curve which the tip 21 may follow if the resonances of the compound armature are correctly designed. For best operation of the device it is desirable that the tip of the foot strike the device to be driven early in the first quadrant of its path, that is in the first half of the convex side of the path, and that it keep in contact with the device throughout quadrants 1 and 2. As the tip of the foot moves from quadrant 2 to quadrant 3, the foot should separate from the device to be driven and remain separated throughout quadrants 3 and 4. When energy is being stored up in the entire driving system the foot should be out of contact with the member to be driven. Then, at the start of quadrant 1 when the system is full of energy, contact should be made between the foot and the device to be driven and the entire amount of stored up energy is expended in a powerful, mechanically-stepped-up, flail-like blow throughout quadrants 1 and 2. In this respect the device acts like a pneumatic impact wrench wherein the mass of the hammer is accelerated during a portion of a revolution without a driving engagement between the hammer and the nut to be tightened. When the system has stored up sufficient energy the hammer is quickly connected to the nut to be driven and its stored up energy is applied to the nut in the form of a quick, powerful blow. Timing in the impact wrench is critical, and a good valve tripping mechanism is very important. In the device of the present invention the introduction of the proper resonant conditions into the system, assures the proper critical timing so that the blow is struck by the foot at the instant that the maximum energy is stored in the system. The proper resonance conditions in the present invention act as the timing valve in the impact wrench. Without proper timing virtually no power is imparted to the device to be rotated.

Figure 4:
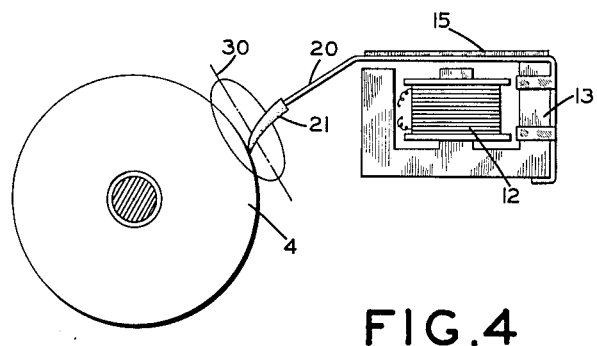
Figure 4 is a side view showing the vibratory device of the invention applied to a wheel in a preferred manner.

Figure 4 schematically illustrates a vibratory impeller of the aforedescribed type, and shows the preferred relationship for driving a wheel at relatively high speed and low power. The major axis 30 of the lenticular curve should make an angle $\theta$ with the radius of the wheel drawn to the point of contact of the foot and the wheel and this angle $\theta$ should be about 90°, and in the event that the curve has one concave side, as shown in Figure 3, the contact of the foot with the wheel should occur on the convex side of the curve. For relatively lower speed and higher power the relationship should be as shown in Figure 4 wherein $\theta$ is about 10° or less. Thus a motor made in accordance with this invention and properly mounted relative to the device to be driven, in effect, has has its own "built in" gears without the added expense of fabricated gear wheels. For any positional relationship other than that shown in Figure 4 a different force-speed relationship is obtained. Thus, the designer utilizing the principle herein disclosed can produce wheel-type toys with optium speed and force characteristics, and no gears are needed. The flail-like action of the device properly applied to a device to be moved, can do the same job as a relatively expensive rotary-type electric motor working through a chain of gears. Further, it is not essential that the motion of the clutch foot be in the plane of the wheel. Considerable angularity between the two may be tolerated. The armature means of this invention as shown in Figure 1 includes the vibratory portion and integral therewith a connector portion 31. Preferably the portion 32 of the armature means which secures the vibratory portion 17 to the connector portion 31 is the spring member which, together with the mass of the armature 17, forms the tuned resonant system, and as such may be heat-treated to obtain fatigue resistance. Extending about 90 degrees to the vibratory portion 17 is the connector portion 31 which included a plurality of connector arms 35, preferably 4 in number. These arms 35 are bent around one leg 13 of the core to secure the armature means to the core. As shown in Figure 2, it is desirable to have the armature means made out of two pieces of metal. One piece comprises a portion of the vibrating armature, the spring area 32, and the connector portion 31 with arms 35. The spring area 32 is heat treated to give it its required degree of springiness and to give it resistance to fatigue. The other piece comprises one or more laminations of magnetizable material secured to the one-piece connector forming with it the vibratory armature 17. As shown in Figure 2 it may be desirable to have the spring material of the connector 31, 32 extend beyond the armature 17 and form the spring arm 20 whose mass, together with the mass of the foot 21 and the compliances of the spring 20, forms the second resonant system of this invention as it has previously been explained.

The devices of this invention may be directly connected to the ordinary 110 volt 60-cycle-per-second household current when they are properly designed, or they may be run off of a transformer connected to household current. An outstanding advantage of the invention when the device is used with transformer is that it is so efficient that the size of the transformer can be reduced to about a quarter of the size of the ordinary transformer. For example; a child's electric train has been driven using one of the impellers of this invention. The impeller was energized from a transformer and about ¼ as much current was used compared to the usual electric train and transformer combination. In addition to the device itself costing less than ordinary electric motor, if it is transformer operated the manufacturers can save even more money on the transformer than on the impeller.

Figure 9 shows a special type of clutch foot. It comprises a rather massive block of rubber 60 or the like, through which extends a hole 61 in a direction substantially perpendicular to the plane of motion of the clutch foot. An axle 62 to be rotated extends through the hole 61, and its outer diameter is slightly less than the internal diameter of the hole 61 providing a slight amount of clearance on all sides of the axle 62.

The clutch foot 60 is connected to the inclined arm which is itself connected to the free end of a vibrating armature by slipping the end of the arm into the slot 63. Frictional forces will hold the foot onto the arm during operation of the device. The clutch foot 60 preferably is driven in an elliptical path by the vibrator, causing the foot to engage the axle first on one side and then on the opposite side. The motion is such that during one cycle of operation the foot strikes the axle twice, and both times imparts to the axle a driving force which tends to rotate the axle in the same direction. A very rapid and powerful rotary motion of the axle results.

A device employing this type of clutch foot, similarly to the previously described impeller, should be so designed that the mass of the vibrating members and the compliance of the armature form a non-polarized resonant system tuned to a frequency below twice the frequency of the existing alternating current. But contrary to the aforedescribed impeller, for the device per se it is not essential that the mass of the clutch foot means and the compliance of the clutch foot means for a second resonant system tuned to a frequency above 2F. However, when the clutch foot 60 is in driving engagement with the shaft 62 the effect must be the same as if the arm and foot were tuned to a frequency above 2F. Thus, it is possible to produce a vibrator device using the special foot 60 whenever the first resonant system is tuned to a frequency below 2F and the second resonant system is also tuned to a frequency below 2F, but when that device is in operation and the clutch foot 60 is driving an axle 62, the loading of the foot 60 must be such as to raise its apparent resonant frequency above 2F. Otherwise the transfer of energy from the vibrator to the axle 62 is so inefficient as to render the device almost worthless.

An essential feature of the invention which runs through the aforedescribed two non-polarized species is that when the impeller is in contact with the device to be driven its clutch foot tries to describe a lenticular curve, though the curve may not be exactly symmetrical due to the contact with the device to be driven. Thus the foot may want to describe a perfect ellipse due to the proper resonant conditions which have heretofore been described, but due to its forceful engagement of a wheel in the first quadrant of its curve its motion may not look like an ellipse.

In the past vibrators with compound arms have been described. However, no one apparently has recognized the extreme importance of properly correlating the masses and compliances of the parts to effect an efficient transfer of energy from the electric coil to the device to be moved.

It is possible to design a vibrator with a compound vibrating arm wherein the tip of the foot moves in a very nice ellipse so long as the foot does not touch anything, but the instant the foot engages a device to be driven the system no longer tries to drive the foot in an ellipse and very little, if any, energy is transferred to the member to be driven. Such a system, though superficially looking like the system of the present invention, is of no commercial value.

Figure 11 shows one of the devices of the invention mounted on a child's phonograph for rotating the turntable 70. The turntable 70 is rotatably mounted on the base 71, and the impeller 72 is mounted on a plate 73 which is pivotably connected to the base 71 by a single bolt or the like 74. Thus the plate 73 may be rotated with respect to the turntable 70 and since it carries the impeller 72 it adjusts slightly the relative position of the turntable and the impeller. This adjustment alters the speed of the turntable so that the operator can select the proper playback speed. A block of sponge rubber 75 or other shock absorbing material preferably is positioned between the impeller 72 and the base 71 to reduce the slight hum which the impeller produces.

Figure 10 illustrates a magnetically polarized system wherein a permanent magnet 80 is mounted in the flux path of the core. Instead of the permanent magnet a direct electric current coil may be used to polarize the system as is known to the art. In this system the armature tends to vibrate at the same frequency as the exciting alternating electric current. With the armature vibrating at a frequency F the second resonant system comprised of the mass of the clutch foot means and the compliance of the clutch foot means should be tuned to a frequency above F and the advantages of efficient transfer of power will be achieved.

While there have been described what are at present considered to be the preferred embodiments of this invention, it will be obvious to those skilled in the art that various changes and modifications may be made therein without departing from the invention, and it is therefore aimed in the appended claims to cover all such changes and modifications as fall within the spirit and scope of the invention.

I claim as my invention:

1. In an electromechanical resonant vibratory system for driving a member to be driven, an electromagnet having a coil to be connected to a source of alternating electric current and having a fixed core associated with said coil forming part of magnetic circuit, compliant armature means one portion of which is free to vibrate the forming part of said magnetic circuit and defining with said core an air gap, compliant clutch foot means connected to the free portion of said armature means and extending at an angle thereto and including a portion for engaging said member to be driven, said armature means vibrating at a frequency $f$ under the influence of the varying magnetic field of the coil, the effective distributed mass of the armature means and of the compliant clutch foot means and the effective distributed compliance of the armature means when in contact wtih the member to be driven forming a resonant system tuned to a frequency below $2f$, and the effective distributed mass of the compliant clutch foot means together with its effective distributed compliance forming a resonant system which when the clutch foot means is in contact with the member to be driven has a resonant frequency greater than $f$ whereby the free end of said compliant clutch foot means while driving said member to be driven describes a lenticular curve with at least one side convex upon said coil being energized with alternating electric current, said foot means being out of contact with said member to be driven once in each traverse of said lenticular curve.

2. An electromechanical resonant vibratory system as set forth in claim 1, further characterized by permanent magnet means associated with said compliant armature means for magnetically polarizing said system.

3. An electromechanical resonant vibratory system as set forth in claim 1, further characterized by said system being free of a permanent magnet.

4. An electromechanical resonant vibratory system as set forth in claim 1, further characterized by said compliant clutch foot means including a massive clutch foot formed of compliant rubber-like material having a hole through it in a direction perpendicular to the plane of said lenticular curve for receiving said member to be driven.

5. In an electromechanical resonant vibratory system for driving a member to be driven, an electromagnet having a coil to be connected to a source of alternating electric current of frequency F and having a fixed core associated with said coil forming part of a magnetic circuit, compliant armature means one portion of which is free to vibrate forming part of said magnetic circuit and defining with said core an air gap, compliant clutch foot means connected to the free portion of said armature means and extending at an angle thereto and including a portion for engaging said member to be driven, the overall distributed mass of said armature means and said clutch foot means, and the overall distributed compliance of said armature means forming a first resonant vibratory system tuned to a frequency below 2F, and the effective mass of said clutch foot means and the effective compliance of said clutch foot means when in engagement with said member to be driven forming a second resonant vibratory system tuned to a frequency above 2F whereby the engaging portion of said compliant clutch foot means while driving said member to be driven describes a lenticular curve with at least one side convex upon said coil being energized, said foot means being out of contact with said member to be driven once in each traverse of said lenticular curve.

6. An electromechanical resonant vibratory system as set forth in claim 5, further characterized by said compliant clutch foot means including a massive clutch foot formed of compliant rubber-like material having a hole through it in a direction perpendicular to the plane of said lenticular curve for receiving said member to be driven.

7. An electromechanical resonant vibratory system as set forth in claim 5, further characterized by said compliant clutch foot means being longitudinally curved.

8. In an electromechanical resonant drive system for driving a member to be driven and having a coil to be connected to a source of alternating electric current of frequency F and having a fixed core associated with said coil forming part of a magnetic circuit, compliant armature means one portion of which is free to vibrate forming part of said magnetic circuit with the free portion thereof defining with said core an air gap, compliant clutch foot means connected to the free portion of said armature means and extending at an angle thereto, the overall distributed mass of said armature means and said clutch foot means and the overall distributed compliance of said armature means forming a first resonant vibratory system tuned to a frequency below 2F, and the mass of said clutch foot means and its compliance forming a second resonant vibratory system tuned to a frequency above 2F whereby the free portion of said compliant clutch foot means describes a lenticular curve with at least one side convex upon said coil being energized, said foot means being out of contact with said member to be driven once in each traverse of said lenticular curve.

9. An electromechanical resonant vibratory system as set forth in claim 8 further characterized by said compliant clutch foot means including a massive clutch foot formed of compliant rubber-like material having a hole through it in a direction perpendicular to the plane of said lenticular curve for receiving said member to be driven.

10. An electromechanical resonant vibratory system as set forth in claim 8 further characterized by said compliant clutch foot means being longitudinally compliant and being longitudinally curved.

11. In an electromechanical resonant vibratory drive system for driving a member to be driven and having a coil to be connected to a source of alternating electric current of frequency F and having a fixed core associated with said coil forming part of a magnetic circuit, compliant armature means one end of which is connected to said core and forming part of said magnetic circuit the free end of which defines with said core and air gap, compliant clutch foot means connected to the free end of said armature means and extending at an angle to said armature means, the overall distributed mass of said armature means and said clutch foot means and the overall distributed compliance of said armature means forming a first resonant vibratory system tuned to a frequency below 2F, and the overall distributed mass of said compliant clutch foot means and its overall distributed compliance forming a second resonant vibratory system tuned to a frequency above 2F, whereby a portion of said compliant clutch foot means describes a lenticular curve with at least one side convex upon said coil being energized, said foot means being out of contact with said member to be driven once in each traverse of said lenticular curve.

12. An electromechanical resonant vibratory system as set forth in claim 11, further characterized by said compliant clutch foot means including a massive clutch foot formed of compliant rubber-like material having a hole through it in a direction perpendicular to the plane of said lenticular curve for receiving said member to be driven.

13. An electromechanical resonant vibrating system as set forth in claim 11, further characterized by said compliant clutch foot means being longitudinally compliant and being longitudinally curved.

14. In an electromechanical resonant vibratory driving system for driving a member to be driven and having a coil to be connected to a source of alternating electric current of frequency F and having a fixed core within said coil forming part of a magnetic circuit, armature means mounted to form part of said magnetic circuit and defining with said fixed core an air gap, spring means biasing said armature means when said armature means is vibrating, compliant clutch foot means one end of which is connected to the free end of said armature means, the overall distributed mass of said armature means and said compliant clutch foot means and the compliance of said spring means forming a first resonant vibratory system tuned to a frequency below 2F, and the overall distributed mass of said compliant clutch foot means and its overall distributed compliance forming a second resonant vibratory system tuned to a frequency above 2F whereby a portion of said compliant clutch foot means describes a lenticular curve with at least one side convex upon said coil being energized, said foot means being out of contact with said member to be driven once in each traverse of said lenticular curve.

15. An electromechanical resonant vibratory system as set forth in claim 14, further characterized by said compliant clutch foot means including a massive clutch foot formed of compliant rubber-like material having a hole through it in a direction perpendicular to the plane of said lenticular curve for receiving said member to be driven.

16. An electromechanical resonant vibratory system as set forth in claim 14, further characterized by said compliant clutch foot means being longitudinally compliant and being longitudinally curved.

17. In an electromechanical resonant vibratory drive system for driving a member to be driven and having a coil to be connected to a source of alternating current of frequency F and having a fixed core within said coil, said core forming part of a magnetic circuit, armature means mounted to form part of said magnetic circuit and defining with said fixed core an air gap, spring means biasing said armature means, compliant arm means, one end of which is connected to the free end of said armature means and extending at an angle to said armature means, a compliant clutch foot connected to the free end of said arm means, the overall distributed mass of said armature means, said arm means, and said foot, and the compliance of said spring means forming a resonant vibratory system tuned to a frequency below 2F, and the overall distributed mass of said arm means and said foot and the compliance of said arm means forming a second resonant vibratory system tuned to a frequency above 2F whereby said compliant clutch foot describes a lenticular curve with at least one side convex, said foot means being out of contact with said member to be driven once in each traverse of said lenticular curve.

18. An electromechanical resonant vibratory system as set forth in claim 17, further characterized by said compliant clutch foot being massive and formed of rubber-like material and having a hole through it in a direction perpendicular to the plane of said lenticular curve for receiving said member to be driven.

19. An electromechanical resonant vibratory system as set forth in claim 17, further characterized by said compliant clutch foot being longitudinally compliant and being longitudinally curved.

20. In an electromechanical resonant vibratory drive system for driving a member to be driven and including a core, an energizing coil around said core to be connected to a source of alternating current, and vibrating armature means for driving member; said armature means comprising a flux carrying portion spring biased with respect to said core and having a free end, and compliant arm means connected to the free end of said flux carrying portion and extending away therefrom at an angle; the mass of said armature means and the compliance of said spring bias forming a resonant system tuned to a frequency below twice the frequency of the alternating current source connected to said energizing coil, and the mass of said compliant arm means and the compliance thereof forming a second resonant system tuned to a frequency above twice the frequency of said alternating current source, whereby the free end of said compliant arm means describes a lenticular curve, and means mounting said drive system adjacent said member to be driven so that said free end of said compliant arm means engages said member to be driven only throughout a portion of its traverse along said lenticular curve.

References Cited in the file of this patent

UNITED STATES PATENTS

| 1,718,147 | Hermann et al. | June 18, 1929 |
| 1,761,146 | Muck | June 3, 1930 |
| 1,816,102 | Waters et al. | July 28, 1931 |
| 2,451,840 | Lewandowski | Oct. 19, 1948 |
| 2,656,474 | Rohden | Oct. 20, 1953 |
| 2,770,742 | Fuchs | Nov. 13, 1956 |

FOREIGN PATENTS

| 734,344 | France | July 26, 1932 |
| 1,003,268 | France | Nov. 14, 1951 |